US010726596B2

(12) United States Patent
Imamura et al.

(10) Patent No.: US 10,726,596 B2
(45) Date of Patent: Jul. 28, 2020

(54) MOVEMENT ANALYZE DEVICE, MOVEMENT ANALYZE METHOD, AND PROGRAM STORAGE MEDIUM

(71) Applicant: CASIO COMPUTER CO., LTD., Tokyo (JP)

(72) Inventors: Keiichi Imamura, Tokyo (JP); Takeshi Okada, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 319 days.

(21) Appl. No.: 15/798,474

(22) Filed: Oct. 31, 2017

(65) Prior Publication Data

US 2018/0182147 A1 Jun. 28, 2018

(30) Foreign Application Priority Data

Dec. 28, 2016 (JP) .................................. 2016-256147

(51) Int. Cl.
*G06T 11/60* (2006.01)
*G01S 19/26* (2010.01)
*G01S 19/19* (2010.01)

(52) U.S. Cl.
CPC .............. *G06T 11/60* (2013.01); *G01S 19/19* (2013.01); *G01S 19/26* (2013.01)

(58) Field of Classification Search
CPC combination set(s) only.
See application file for complete search history.

(56) References Cited

U.S. PATENT DOCUMENTS

2014/0266160 A1* 9/2014 Coza ...................... G01B 7/003
324/207.11
2016/0263435 A1 9/2016 Venkatraman et al.
2016/0361598 A1* 12/2016 Nagahara ............... G04G 21/02
2018/0172835 A1* 6/2018 Koochew ................ G01S 19/19
2019/0036360 A1* 1/2019 Zilles ..................... A63B 57/20

FOREIGN PATENT DOCUMENTS

JP 2003-236028 A 8/2003
JP 2016-198530 A 12/2016

OTHER PUBLICATIONS www.traceup.com/soccer/how-it-works, retrieved on Apr. 25, 2019.
Notification of Reasons for Refusal dated Jan. 29, 2019 received in Japanese Patent Application No. JP 2016-256147 together with an English language translation.

* cited by examiner

Primary Examiner — Mamadou L Diallo
(74) Attorney, Agent, or Firm — Scully Scott Murphy & Presser

(57) ABSTRACT

In a wrist terminal 1, the measurement information acquiring unit 51 acquires position information. The first timing detection unit 52 detects a standby state for a sport. The second timing detection unit 53 detects predetermined start timing of the sport. If the first timing detection unit 52 detects the standby state, the recording control unit 54 makes the measurement information acquiring unit 51 start acquiring position information to continue acquiring position information sequentially at predetermined intervals. If the second timing detection unit 53 detects the predetermined start timing, the recording control unit 54 stores position information being part of the position information already acquired by the measurement information acquiring unit 51 and corresponding to the predetermined start timing into a ROM 16 or a removable medium 31.

17 Claims, 5 Drawing Sheets

MOVEMENT ANALYZE DEVICE, MOVEMENT ANALYZE METHOD, AND PROGRAM STORAGE MEDIUM

CROSS-REFERENCE TO RELATED APPLICATIONS

This application is based upon and claims the benefit of priority under 35 USC 119 of Japanese Patent Application No. 2016-256147 filed on Dec. 28, 2016 the entire disclosure of which, including the description, claims, drawings, and abstract, is incorporated herein by reference in its entirety.

BACKGROUND OF THE INVENTION

Field of the Invention

The present invention relates to a movement analyze device, a movement analyze method, and a program storage medium.

Related Art

According to a conventionally-known technique employed for a sport such as surfing, snowboarding, or cycling, for example, a device with a built-in sensor is attached to a body to measure various types of data about the sport. For example, patent document 1 discloses a sports assistance portable appliance with a global positioning system (GPS). According to the technique described in patent document 1, for doing a sport such as skiing, snowboarding, or mountain biking, for example, every recording data such as a transition of altitude change, an average slope, a maximum slope, etc., is acquired based on data obtained by a GPS circuit unit. The acquired recording data is displayed on a display unit or stored into a memory.

Patent Document 1: Japanese Unexamined Patent Application, Publication No. 2003-236028

SUMMARY OF THE INVENTION

A movement analyze device according to one aspect of the present invention used for a sport, comprises a processor, the processor executes: position information acquiring processing of acquiring position information; first detection processing of detecting a standby state for the sport; second detection processing of detecting predetermined start timing of the sport; and a control processing of making the position information acquiring processing start acquiring position information to continue acquiring position information sequentially at predetermined intervals if the first detection processing detects the standby state, and stores position information being part of the position information already acquired by the position information acquiring processing and corresponding to the predetermined start timing into storage device if the second detection processing detects the predetermined start timing. A movement analyze method according to one aspect of the present invention comprising: a first detection processing of detecting a standby state for a movement; a second detection processing of detecting predetermined start timing; a position information acquiring processing of starting acquiring position information if the first detection processing detects the standby state; and a storage control processing of storing position information being part of the position information already acquired by the position information acquiring processing and detected to coincide with the predetermined start timing if the second detection processing detects the predetermined start timing. A non-transitory storage medium according to one aspect of the present invention storing a program that controls a processor of a movement analyze device to be held on a body and used for a sport to execute: a position information acquiring processing of acquiring position information; a first detection processing of detecting a standby state for the sport; a second detection processing of detecting predetermined start timing of the sport; and a control processing of making the position information acquiring processing start acquiring position information to continue acquiring position information sequentially at predetermined intervals if the first detection processing detects the standby state, and storing position information being part of the position information already acquired by the position information acquiring processing and corresponding to the predetermined start timing into storage device if the second detection processing detects the predetermined start timing.

DETAILED DESCRIPTION OF THE INVENTION

Figure 1A:
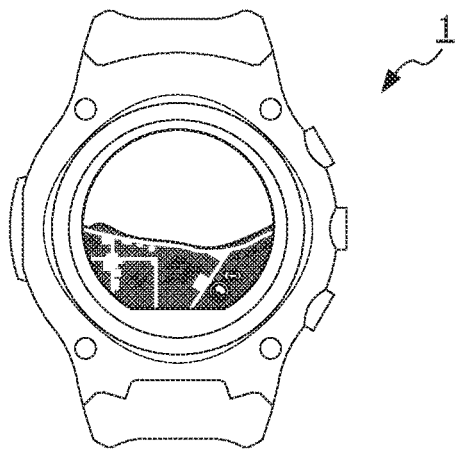
FIG. 1A is an external view showing the configuration of a wrist terminal as an embodiment of a portable terminal according to the present invention.
Figure 1B:
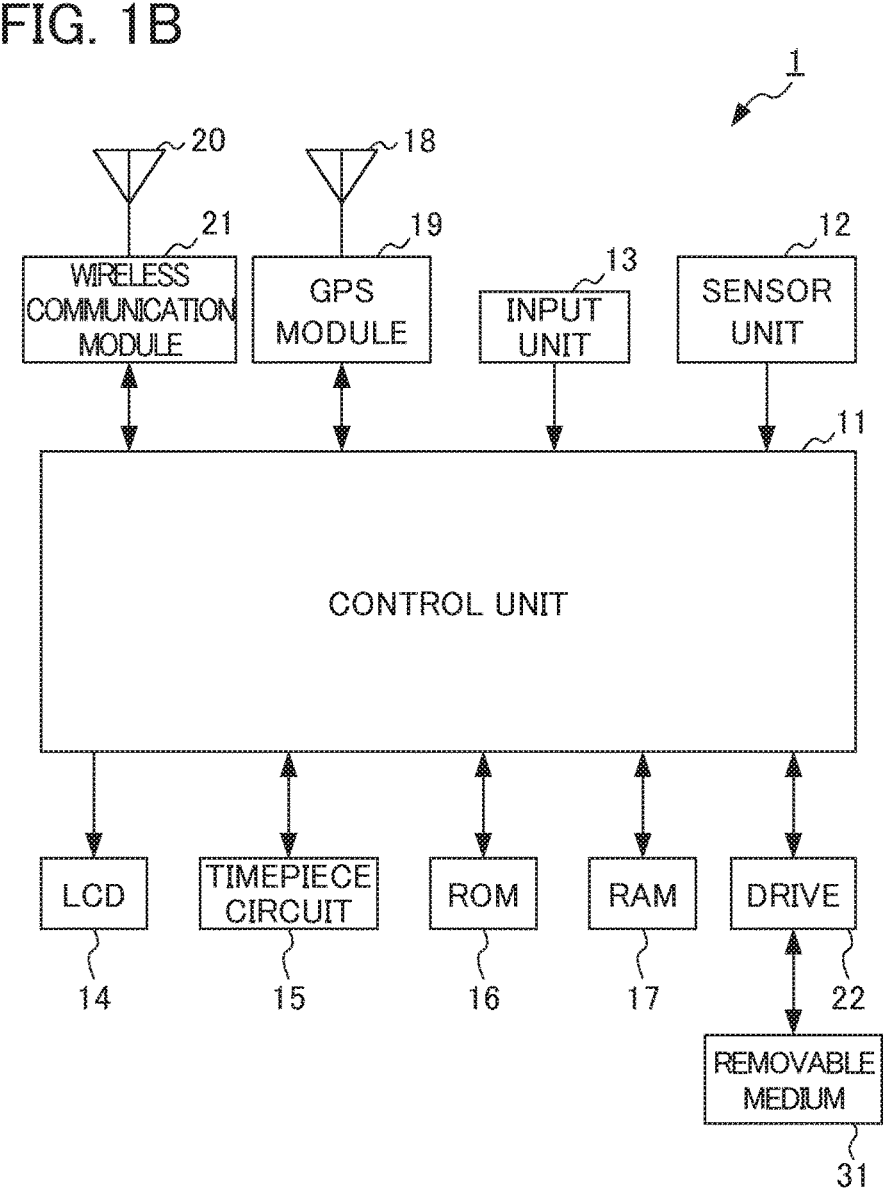
FIG. 1B is a block diagram showing the hardware configuration of the wrist terminal of FIG. 1A.

An embodiment of the present invention will be described below by referring to the drawings.
[Hardware Configuration]
FIGS. 1A and 1B are diagrams illustrating the configuration of the wrist terminal 1 a wrist terminal as an embodiment of an information display device according to the present invention, with FIG. 1A being a view illustrating an outer appearance thereof, and FIG. 1B being a block diagram illustrating a hardware configuration thereof. The wrist terminal 1 is an electronic apparatus that is configured to be of wristwatch type and has functions similar to a smart phone. As illustrated in FIGS. 1A and 1B, the wrist terminal 1 includes a control unit 11, a sensor unit 12, an input unit 13, an LCD (Liquid Crystal Display) 14, a timepiece circuit 15, ROM (Read Only Memory) 16, RAM (Read Access Memory) 17, a GPS antenna 18, a GPS module 19, a wireless communication antenna 20, a wireless communication module 21, and a drive 22. Where appropriate, the wrist terminal 1 can include different hardware such as an imaging unit.

The control unit 11 is configured with an arithmetic processing unit such as a CPU (Central Processing Unit) and controls the overall operation of the wrist terminal 1. For example, the control unit 11 executes various types of processing according to a program such as a program for exercise analyze processing (described later) stored in the ROM 16. The sensor unit 12 includes various types of sensors such as a magnetic field sensor, a three-axis acceleration sensor, a pressure sensor, and altitude sensor. The acceleration sensor detects an acceleration in three axis directions of the wrist terminal 1, and outputs information indicating the detected acceleration to the control unit 11. The gyroscope sensor detects an angular velocity in three axis directions of the wrist terminal 1, and outputs information indicating the detected angular velocity to the control unit 11. The pressure sensor detects the atmospheric pressure of environment where the wrist terminal 1 belongs, and outputs information indicating the detected atmospheric pressure to the control unit 11. Based on the information output from the pressure sensor, the wrist terminal 1 detects the altitude of the wrist terminal 1.

The input unit 13 is configured with various buttons or capacitive-type or resistance-film-type position input sensors laminated on a display area of the LCD 14, and inputs various types of information according to a user's operation for instruction. The LCD 14 outputs an image according to an instruction of the control unit 11. For example, the LCD 14 displays various images and screens of a user interface. In the present embodiment, a position input sensor of the input unit 13 is arranged so as to be superimposed on the LCD 14 to constitute a touch screen. The timepiece circuit 15 generates a time signal from signals generated by a system clock or oscillator to output the current time.

The ROM 16 stores information such as control programs executed by the control unit 11. The RAM 17 provides a work area upon the control unit 11 executing various types of processing. The GPS antenna 18 receives radio waves sent from satellites for GPS, converts them into electrical signals, and outputs the electrical signals thus converted (hereinafter, referred to as "GPS signal") to the GPS module 19. The GPS module 19 detects the location (latitude, longitude, and altitude) of the wrist terminal 1 and the current time shown by the GPS based on the GPS signals inputted from the GPS antenna 18. Furthermore, the GPS module 19 outputs information showing the location thus detected and the current time to the control unit 11.

The wireless communication antenna 20 is an antenna that can receive radio waves of frequencies corresponding to wireless communication used by the wireless communication module 21 and is configured with a loop antenna and a rod antenna, for example. The wireless communication antenna 20 sends electrical signals of wireless communication inputted from the wireless communication module 21 as electromagnetic waves, converts the electromagnetic waves thus received into electrical signals, and outputs them to the wireless communication module 21. The wireless communication module 21 sends signals to another apparatus via the wireless communication antenna 20 in accordance with an instruction from the control unit 11. Furthermore, the wireless communication module 21 receives signals sent from another apparatus and outputs information indicated by the signals thus received to the control unit 11. A removable medium 31 composed of a magnetic disk, an optical disk, a magneto-optical disk, semiconductor memory or the like is installed in the drive 22, as appropriate. The removable medium 31 can store a variety of data such as the image data.

Figure 2:
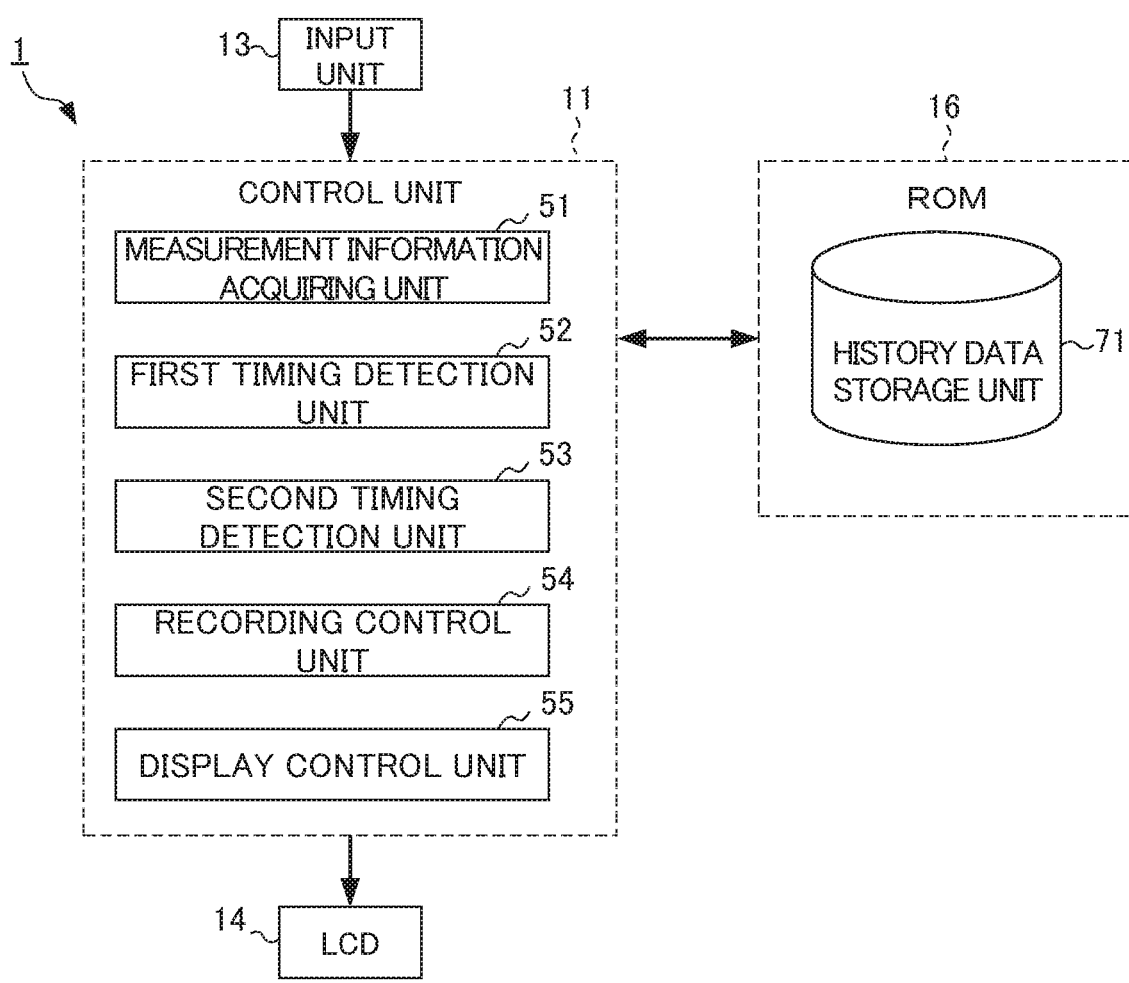
FIG. 2 is a functional block diagram showing a functional configuration forming the functional configuration of the wrist terminal of FIG. 1A and responsible for execution of exercise analyze processing.

FIG. 2 is a functional block diagram showing a functional configuration forming the functional configuration of the wrist terminal 1 of FIGS. 1A and 1B and responsible for execution of the exercise analyze processing (move analyze processing). The exercise analyze processing is a series of steps executed if an automatic measurement mode for measuring exercise automatically is set. These steps are executed to analyze exercise by a user wearing the wrist terminal 1 based on various types of measurement information acquired about the exercise by the user. In an example described in this embodiment, the exercise by the user is analyzed by acquiring various types of measurement information obtained when the user does surfing while wearing the wrist terminal 1. In the description given below, an action by a surfer of riding on a wave and standing up on a surfboard is called "takeoff," a subsequent action of falling off the surfboard resulting, for example, from a wave break is called "wipeout," and a state from the takeoff to the wipeout in which the surfer is on a wave is called "riding."

As shown in FIG. 2, to execute the exercise analyze processing, a measurement information acquiring unit 51, a first timing detection unit 52, a second timing detection unit 53, a recording control unit 54, and a display control unit 55 come into operation in the control unit 11. A history data storage unit 71 is set in a partial area of the ROM 16. The history data storage unit 71 stores data about a riding history recorded for one ride of surfing. In this embodiment, data about a riding history to be stored includes a path of riding (position and height), a highest speed, a distance of one riding, a duration of one riding, a time of takeoff, etc. One riding will be counted as "one motion."

The measurement information acquiring unit 51 acquires a result of positioning by the GPS module 19 and results of detections by the various sensors provided in the sensor unit 12 (where appropriate, these results will collectively be called "measurement information") at predetermined intervals (at intervals of 0.1 seconds, for example). In this embodiment, the measurement information also includes data obtained by making appropriate calculation (differentiation, for example) on the output data from the sensor.

The first timing detection unit 52 determines whether or not a user wearing the wrist terminal 1 is in a standby state for surfing based on the measurement information acquired by the measurement information acquiring unit 51. A determination as to whether or not the user is in the standby state for surfing can be made by determining whether or not the position of the user is closer to the sea than a shoreline, for example. After the first timing detection unit 52 detects the standby state for surfing, the first timing detection unit 52 determines whether or not the user has finished surfing. A determination as to whether or not the user has finished surfing can be made by determining whether or not the position of the user is closer to land than the shoreline. In this description, the standby state is to be detected automatically. Alternatively, in response to user's operation on a button, the first timing detection unit 52 may accept the manual setting of the standby state.

The second timing detection unit 53 determines whether or not the user wearing the wrist terminal 1 has taken off based on the measurement information acquired by the measurement information acquiring unit 51. In this embodiment, a determination as to whether or not the user wearing the wrist terminal 1 has taken off can be made by determining whether or not a moving speed has reached a speed threshold (here, 15 [km/s]) or more. The second timing detection unit 53 further determines whether or not the user wearing the wrist terminal 1 has wiped out based on the measurement information acquired by the measurement information acquiring unit 51. In this embodiment, a determination as to whether or not the user wearing the wrist terminal 1 has wiped out can be made by determining whether or not the moving speed has become less than the above-described speed threshold.

If the first timing detection unit 52 detects the standby state for surfing, the recording control unit 54 starts temporarily storing the measurement information acquired by the measurement information acquiring unit 51 into the RAM 17. For example, if the standby state for surfing is detected, the recording control unit 54 stores measurement information corresponding to a predetermined period of time (60 seconds, for example) sequentially into a storage region such as a first-in first-out (FIFO) storage region formed in the RAM 17. If the second timing detection unit 53 detects the takeoff and then the wipeout, the recording control unit 54 records (saves) measurement information being part of the measurement information temporarily stored in the RAM 17 and corresponding to a period of time from the takeoff to the wipeout into the ROM 16 or the removable medium 31 attached to the drive 22. At this time, the recording control unit 54 may record measurement information corresponding to a period of time from a moment before the takeoff with a predetermined time interval (three seconds before the takeoff, for example) to a moment after the wipeout with a predetermined time interval (three seconds after the wipeout, for example).

If the first timing detection unit 52 starts temporarily storing the measurement information, the display control unit 55 displays predetermined measurement information on the LCD 14 as data being measured. If the user gives an instruction to display a history map screen, the display control unit 55 displays a screen of a map on the LCD 14 on which a history of each one riding is displayed based on the measurement information recorded in the ROM 16 or the removable medium 31 by the recording control unit 54.

Figure 3:
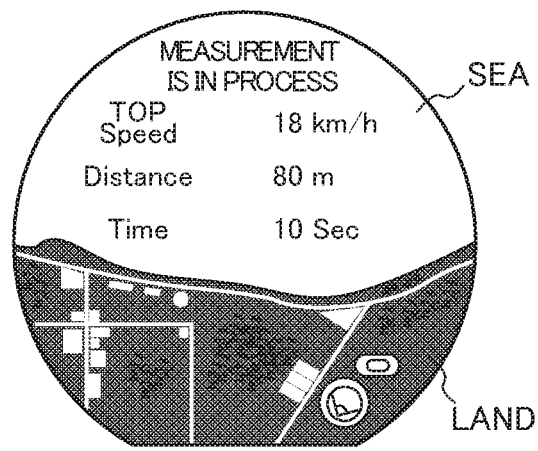
FIG. 3 is a schematic view showing an example of a screen showing that measurement is in process on which measurement information is displayed as data being measured.

FIG. 3 is a schematic view showing an example of a screen showing that measurement is in process on which measurement information is displayed as data being measured. As shown in FIG. 3, the displayed screen showing that measurement is in process includes a map of a coast in the vicinity of a current position as a background, and the following pieces of measurement information: "TOP Speed" indicating a highest speed, "Distance" indicating a distance of riding, and "Time" indicating a duration of the riding. Data about the map of the coast in the vicinity of a current position may be stored data or may be downloaded from the Internet. The screen showing that measurement is in process may not include the background showing the map of the coast in the vicinity of a current position but it may include only the measurement information displayed in larger character sizes.

Figure 4:
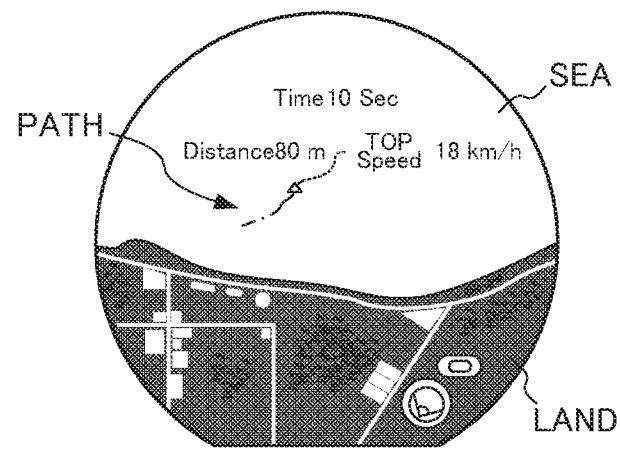
FIG. 4 is a schematic view showing an example of a screen of a map on which a history of one riding is displayed.

FIG. 4 is a schematic view showing an example of a screen of a map on which a history of one riding is displayed. As shown in FIG. 4, the displayed map screen includes a map of a coast in the vicinity of a current position as a background, and the following pieces of measurement information: a line indicating a path of one riding from a start position (takeoff position) to a finish position (wipeout position), "TOP Speed," "Distance," and "Time." The line displayed on the map screen shows a position where a highest speed is observed during this riding identified by a mark, and speeds observed at corresponding positions identified by different line colors. For example, a position where a speed less than 20% of the highest speed can be identified in blue, a position where a speed of 20% or more and less than 40% of the highest speed can be identified in light blue, a position where a speed of 40% or more and less than 60% of the highest speed can be identified in green, a position where a speed of 60% or more and less than 80% of the highest speed can be identified in yellow, and a position where a speed of 80% of the highest speed or more can be identified in red. In FIG. 4, the speeds at the corresponding positions are schematically shown by different line types.

In this embodiment, a map of a coast in the vicinity of a current position is displayed in such a manner that a range including the sea is displayed on the upper side of the LCD 14 (upper side of FIG. 1A), and a range including land is displayed on the lower side of the LCD 14 (lower side of FIG. 1A). By doing so, a history of a sport such as surfing to be done at a boundary region between the sea and land can be displayed intuitively easily.

[Operation]

Figure 5:
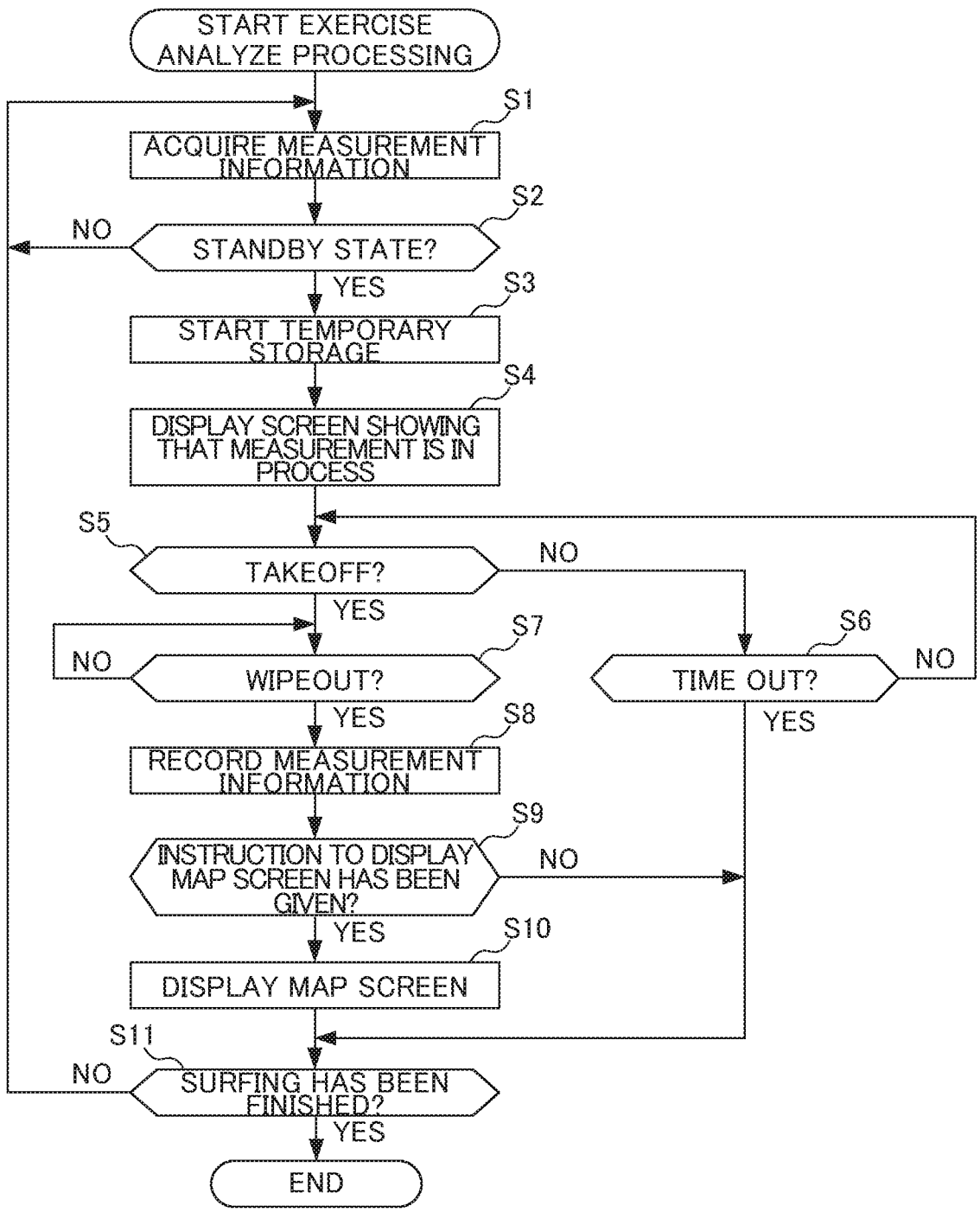
FIG. 5 is a flowchart explaining a flow of the exercise analyze processing executed by the wrist terminal of FIGS. 1A and 1B having the functional configuration of FIG. 2.

The operation of the wrist terminal 1 will be described next. FIG. 5 is a flowchart explaining a flow of the exercise analyze processing executed by the wrist terminal 1 of FIGS. 1A and 1B having the functional configuration of FIG. 2. The exercise analyze processing is started by operation by a user to set the automatic measurement mode.

In step S1, the measurement information acquiring unit 51 acquires a result of positioning by the GPS module 19 and results of detections by the various sensors provided in the sensor unit 12 (measurement information). In step S2, the first timing detection unit 52 determines whether or not a user wearing the wrist terminal 1 is in a standby state for surfing based on the measurement information acquired by the measurement information acquiring unit 51. If the user wearing the wrist terminal 1 is not in the standby state for surfing, a determination of step S2 is NO. Then, the flow of the processing shifts to step S1. If the user wearing the wrist terminal 1 is in the standby state for surfing, a determination of step S2 is YES. Then, the flow of the processing shifts to step S3.

In step S3, the recording control unit 54 starts temporarily storing the measurement information acquired by the measurement information acquiring unit 51 into the RAM 17. In step S4, the display control unit 55 displays predetermined measurement information on the LCD 14 as data being measured (displays a screen showing that measurement is in process). In step S5, the second timing detection unit 53 determines whether or not the user wearing the wrist terminal 1 has taken off based on the measurement information acquired by the measurement information acquiring unit 51. If the user wearing the wrist terminal 1 has not taken off, a determination of step S5 is NO. Then, the flow of the processing shifts to step S6. If the user wearing the wrist terminal 1 has taken off, a determination of step S5 is YES. Then, the flow of the processing shifts to step S7.

In step S6, the second timing detection unit 53 determines whether or not detection of takeoff has timed out. If detection of takeoff has not timed out, a determination of step S6 is NO. Then, the flow of the processing shifts to step S5. If detection of takeoff has timed out, a determination of step S6 is YES. Then, the flow of the processing shifts to step S11. In step S7, the second timing detection unit 53 determines whether or not the user wearing the wrist terminal 1 has wiped out based on the measurement information acquired by the measurement information acquiring unit 51. If the user wearing the wrist terminal 1 has not wiped out, a determination of step S7 is NO. Then, step S7 is repeated. If the user wearing the wrist terminal 1 has wiped out, a determination of step S7 is YES. Then, the flow of the processing shifts to step S8.

In step S8, the recording control unit 54 stores measurement information being part of the measurement information temporarily stored in the RAM 17 and corresponding to a period of time from the takeoff to the wipeout into the ROM 16 or the removable medium 31 attached to the drive 22. The recording control unit 54 may record measurement information corresponding to a period of time from a moment before the takeoff with a predetermined time interval to a moment after the wipeout with a predetermined time interval. In step S9, the display control unit 55 determines whether or not the user has given an instruction to display a history map screen. If the user has not given an instruction to display a history map screen, a determination of step S9 is NO. Then, the flow of the processing shifts to step S11. If the user has given an instruction to display a history map screen, a determination of step S9 is YES. Then, the flow of the processing shifts to step S10.

In step S10, the display control unit 55 displays a screen of a map on the LCD 14 on which a history of each one riding is displayed based on the measurement information recorded in the ROM 16 or the removable medium 31 by the recording control unit 54. In step S11, the first timing detection unit 52 determines whether or not the user has finished surfing. If the user has not finished surfing, a determination of step S11 is NO. Then, the flow of the processing shifts to step S1. If the user has finished surfing, a determination of step S11 is YES. Then, the exercise analyze processing is finished.

As a result of the above-described processing, if the user is in the standby state for surfing, measurement information is stored temporarily in the movement analyze device 1. After one riding (from takeoff to wipeout) is finished, measurement information being part of the measurement information temporarily stored and corresponding to the one riding is recorded. This reduces the occurrence of a situation where timing of acquiring measurement information is delayed. Thus, position information about doing a sport, etc., can be acquired more correctly.

[First Modification]

In the above-described embodiment, if the automatic measurement mode is set, the first timing detection unit 52 can determine whether a user wearing the wrist terminal 1 is in a standby state for surfing, bodyboarding, snowboarding, or skiing based on measurement information acquired by the measurement information acquiring unit 51. In this case, a sport for which the user is in the standby state can be determined by setting respective conditions for identifying the standby state on a result of positioning by the GPS module 19 and on results of detections by the various sensors provided in the sensor unit 12 (measurement information), and by determining whether or not a current state satisfies these conditions.

For example, surfing and bodyboarding can be distinguished from snowboarding and skiing as follows based on measurement information: if a current position is at the sea, the user is determined to be in the standby state for surfing or bodyboarding; if a current position is at a mountain, the user is determined to be in the standby state for snowboarding or skiing. Surfing and bodyboarding can be distinguished from each other by determining whether or not the user has made an action of standing up based on measurement information, for example. Snowboarding and skiing can be distinguished from each other using the direction of the body of the user relative to a traveling direction determined based on measurement information. The first timing detection unit 52 may accept setting showing a sport for which the user is in the standby state in response to selection of the sport made manually by the user.

After the standby state is detected, the recording control unit 54 records (saves) measurement information about exercise corresponding to one motion such as riding from takeoff to wipeout into the ROM 16 or the removable medium 31 attached to the drive 22. For this recording (saving), the recording control unit 54 of this modification starts recording measurement information before start of the one motion with a first time interval for surfing and bodyboarding, and starts recording measurement information before start of the one motion with a second time interval for snowboarding and skiing. The first time interval is set longer than the second time interval.

By doing so, measurement information about surfing and bodyboarding, considered to attract greater interest from a user if being done for a longer duration before start of the one motion, can be recorded for a longer period of time than snowboarding and skiing before start of the one motion of the exercise. Likewise, measurement information about surfing and bodyboarding may be recorded for a longer period of time after finish of the one motion of the exercise than measurement information about snowboarding and skiing.

[Second Modification]

In the above-described embodiment, if the user is determined to have finished surfing in step S11 of the exercise analyze processing and then a standby state for surfing is detected again, the recording control unit 54 may start temporarily storing measurement information. If takeoff is detected thereafter, the recording control unit 54 may record the measurement information into the ROM 16 or the removable medium 31 attached to the drive 22.

[Third Modification]

In the above-described embodiment, for display of a map of a coast in the vicinity of a current position on a map screen, the position of the sea and that of land relative to each other may be set so as to facilitate ease of viewing by a user. Alternatively, such relative positions may be set in such a manner that a range including the sea is displayed on the upper side of the LCD 14 and a range including land is displayed on the lower side of the LCD 14 until a standby state is detected, and that the range including the sea is displayed on the lower side of the LCD 14 and the range including land is displayed on the upper side of the LCD 14 after the standby state is detected and until wipeout is detected. By doing so, a map can be displayed in a direction conforming to exercise by a user.

[Fourth Modification]

Figure 6:
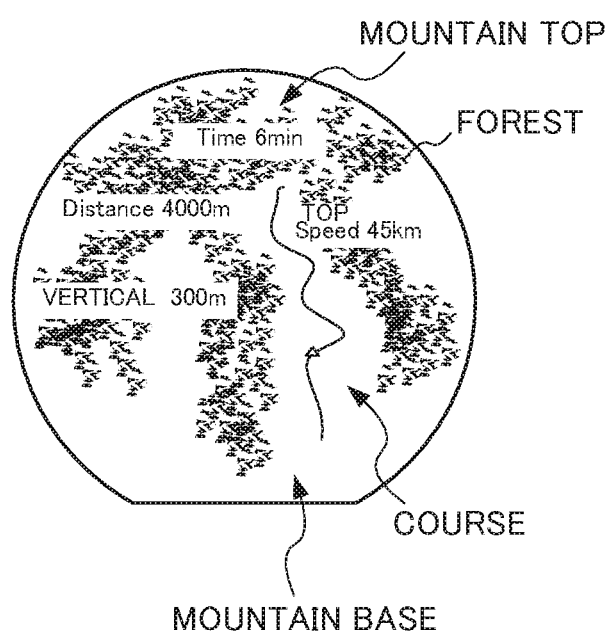
FIG. 6 is a schematic view showing an example of a map screen on which a history of snowboarding or that of skiing is displayed.

In the above-described embodiment, a form of displaying a map screen can be changed in response to the type of a sport. FIG. 6 is a schematic view showing an example of a map screen on which a history of snowboarding or that of skiing is displayed. As shown in FIG. 6, a map of the vicinity of a current position may be displayed for display of a history of snowboarding or that of skiing in such a manner that a range including the top of a mountain is displayed on the upper side of the LCD 14 (upper side of FIG. 1A), and a range including the base of the mountain is displayed on the lower side of the LCD 14 (lower side of FIG. 1A). Thus, a course of snowboarding or that of skiing can easily be understood from the displayed map screen. Like in the third modification, setting may be made in this modification in such a manner that the range including the top of the mountain is displayed on the upper side of the LCD 14 and the range including the base of the mountain is displayed on the lower side of the LCD 14 until a standby state is detected, and that the range including the top of the mountain is displayed on the lower side of the LCD 14 and the range including the base of the mountain is displayed on the upper side of the LCD 14 after the standby state is detected and until finish of a slide is detected. By doing so, a map can also be displayed in a direction conforming to exercise by a user in the case of snowboarding or skiing.

The wrist terminal 1 having the above-described configuration includes the measurement information acquiring unit 51, the first timing detection unit 52, the second timing detection unit 53, the recording control unit 54, and the display control unit 55. The measurement information acquiring unit 51 acquires position information. The first timing detection unit 52 detects a standby state for a sport. The second timing detection unit 53 detects predetermined start timing of the sport. If the first timing detection unit 52 detects the standby state, the recording control unit 54 makes the measurement information acquiring unit 51 start acquiring position information to continue acquiring position information sequentially at predetermined intervals. If the second timing detection unit 53 detects the predetermined start timing, the recording control unit 54 stores position information being part of the position information already acquired by the measurement information acquiring unit 51 and corresponding to the predetermined start timing into the ROM 16 or the removable medium 31. By doing so, if the standby state for the sport is formed, the position information is stored temporarily. If the predetermined start timing of the sport is detected, position information being part of the position information stored temporarily and corresponding to the predetermined start timing is recorded. This reduces the occurrence of a situation where timing of acquiring position information is delayed. As a result, position information about doing a sport, etc., can be acquired more correctly.

The display control unit 55 generates a movement path based on the position information acquired by the measurement information acquiring unit 51. Thus, a movement path from correct start timing of the sport can be generated.

The display control unit 55 displays the generated movement path on a display unit. Thus, a user can be offered the movement path from the correct start timing of the sport.

The second timing detection unit 53 detects the predetermined start timing of the sport and finish timing of the sport. The recording control unit 54 stores a period of time from the start timing to the finish timing as a duration of one motion into the ROM 16 or the removable medium 31. Thus, appropriate timing can be stored as a history.

The recording control unit 54 stores position information corresponding to the period of time from the start timing to the finish timing as information about the one motion into the ROM 16 or the removable medium 31. Thus, position information about appropriate timing can be stored.

The second timing detection unit 53 detects timing of attainment of a predetermined speed per hour or more as the start timing. Thus, the start timing can be detected based on the clear standard.

The second timing detection unit 53 detects timing of reduction to a predetermined speed per hour or less as the finish timing after the start timing is detected. Thus, the finish timing can be detected based on the clear standard.

In doing surfing, etc., riding can be considered to be made successfully only after failing to ride on waves repeatedly and making several tries. In this regard, the second timing detection unit 53 detects timing based on the above-described standard and stores each data about one motion (one riding) into the ROM 16 or the removable medium 31. This acts effectively to prevent recording of many incomplete movement paths or many inappropriate measured values.

The sport is at least one of surfing, bodyboarding, snowboarding, and skiing. The recording control unit 54 saves measurement data about one motion showing that a predetermined speed per hour or more has been measured. This makes it possible to select appropriate measurement data about surfing, bodyboarding, snowboarding, or skiing, and save the selected measurement data.

The recording control unit 54 saves measurement data about one motion showing that the predetermined speed per hour or more has been measured several times. This makes it possible to select more appropriate measurement data about surfing, bodyboarding, snowboarding, or skiing, and save the selected measurement data.

The first timing detection unit 52 identifies the sport for which the standby state is formed. The identified sport is at least one of surfing, bodyboarding, snowboarding, and skiing. Thus, the start timing of surfing, bodyboarding, snowboarding, or skiing can be detected appropriately.

The first timing detection unit 52 determines whether a current position is at sea or at a mountain based on the position information. If the current position is determined to be at sea, the first timing detection unit 52 determines that the standby state is for surfing or bodyboarding. If the current position is determined to be at a mountain, the first timing detection unit 52 determines that the standby state is for snowboarding or skiing. This makes it possible to make a distinction between the standby state for surfing or bodyboarding and the standby state for snowboarding or skiing easily.

The first timing detection unit 52 sets the standby state for at least one of surfing, bodyboarding, snowboarding, and skiing in response to operation by a user. This makes it possible to set the standby state reflecting the intention of the user.

The recording control unit 54 starts saving the measurement data before the start timing with a predetermined time interval. The predetermined time interval set for surfing and bodyboarding differs from the predetermined time interval set for snowboarding and skiing. This makes it possible to save measurement data about each of surfing and bodyboarding, and measurement data about each of snowboarding and skiing by reflecting a period of time appropriately before the start timing considered to attract interest from a user.

The sport is to be done at a coast. The display control unit 55 displays the movement path in such a manner that a range including the sea is displayed on the upper side of the display unit and a range including land is displayed on the lower side of the display unit. By doing so, a map can be displayed in a direction conforming to the exercise by the user.

The wrist terminal 1 includes the first timing detection unit 52, the second timing detection unit 53, and the recording control unit 54. The first timing detection unit 52 detects a standby state for a movement. The second timing detection unit 53 detects predetermined start timing. If the first timing detection unit 52 detects the standby state, the recording control unit 54 starts acquiring position information. If the second timing detection unit 53 detects the predetermined start timing, the recording control unit 54 stores position information being part of the position information already acquired and detected to coincide with the predetermined start timing. Thus, position information about a subject of the movement can be acquired more correctly.

The present invention is not to be limited to the above-described embodiment. Various changes, modifications, etc. are also covered by the present invention as long as such changes, modifications, etc. fall in a range in which the object of the present invention can be achieved.

For example, in the above-described embodiment, the first timing detection unit 52 may determine whether or not a user is in a standby state for surfing by determining whether or not the user is floating on a wave based on measurement information. Further, the first timing detection unit 52 may determine whether or not the user has finished surfing by determining whether or not the user is moving on land (by walking or traveling on an automobile, for example) based on measurement information.

In the above-described embodiment, the second timing detection unit 53 may determine takeoff by detecting a user's transition from a state of floating on a wave to standing up on a surfboard based on measurement information. In this case, the second timing detection unit 53 can detect an upward acceleration resulting from the standing up, or detect the waveform of an acceleration and that of an angular velocity differing from those observed in the floating state.

In the above-described embodiment, the second timing detection unit 53 may determine wipeout by detecting a user's transition from a state of standing up to falling into the sea based on measurement information. In this case, the second timing detection unit 53 can detect a downward acceleration resulting from the falling into the sea, or detect the waveform of an acceleration and that of an angular velocity differing from those observed in the state of standing up on a surfboard.

In the above-described embodiment, a condition for wipeout may be satisfied if a state of falling short of a predetermined speed lasts for a predetermined period of time or more. This can reduce the likelihood of making a determination that a turn made on a relatively slow wave is wipeout, for example.

In the above-described embodiment, the wrist terminal 1 may detect making of a turn based on measurement information and record the number of turns. Further, the wrist terminal 1 may be allowed to record various types of measurement information. For example, the wrist terminal 1 may record the number of ridings, average riding intervals, a total riding distance, etc. In the above-described embodiment, if a position determined by the GPS shows an improper value (if a speed is determined to be 60 [km] or more, for example), measurement information corresponding to this positioning may be excluded from a recording target.

In the above-described embodiment, for display of a map screen, the scale of a map may be set to conform to the length of a path. For display of the map screen, the range of the map may be set in such a manner that the path is displayed within a predetermined area (central area, for example) in a display screen on the LCD 14. In the above-described embodiment, multiple paths may be displayed together on the map screen.

In the above-described embodiment, the GPS is used for acquiring position information. However, the GPS is not a particular limitation. For example, SiRFusion (registered trademark) for acquiring correct position information at high speed using a Wi-Fi access point or a quantum compass allowing measurement of a position even in the water is applicable.

In the above-described embodiment, the wrist terminal is given as an example of an electronic device to which the present invention is applied. However, the wrist terminal is not a particular limitation. For example, the present invention is applicable to general electronic devices having the function of measuring exercise. As more specific examples, the present invention is applicable to a notebook-type personal computer, a tablet terminal, a video camera, a portable navigation device, a cell phone, a smartphone, and a portable gaming device.

In the above-described embodiment, the control unit 11 in the wrist terminal 1 is responsible for control over the functional configuration of FIG. 2 or the operation shown in the flowchart of FIG. 5. Meanwhile, the following operation is also feasible. Data is transmitted through the wireless communication module 21 to a smartphone, for example. The smartphone makes calculation and transfers a result of the calculation to the wrist terminal 1. Then, the result is displayed on the LCD 14. In the above-described embodiment, various types of data are recorded in the RAM 17 inside the wrist terminal 1 or the removable medium 31. Alternatively, data may be transmitted through the wireless communication module 21 to a smartphone and may be recorded into the smartphone, for example.

The present invention is applicable to a field outside of sports. For example, for acquisition of position information and recording of a movement path and movement time, the present invention may be applied to a drone, a throwing-type camera, a Frisbee with a sensor, or a movable robot, for example.

The processing sequence described above can be executed by hardware, and can also be executed by software. In other words, the hardware configuration shown in FIG. 2 is merely an illustrative example, and the present invention is not particularly limited thereto. More specifically, the types of functional blocks employed to realize the above-described functions are not particularly limited to the example shown in FIG. 2, so long as the wrist terminal 1 can be provided with the functions enabling the aforementioned processing sequence to be executed in its entirety. A single functional block may be configured by a single piece of hardware, a single installation of software, or any combination thereof. The functional configurations of the present embodiment are realized by a processor executing arithmetic processing, and processors that can be used for the present embodiment include a unit configured by a single unit of a variety of single processing devices such as a single processor, multi-processor, multi-core processor, etc., and a unit in which the variety of processing devices are combined with a processing circuit such as ASIC (Application Specific Integrated Circuit) or FPGA (Field-Programmable Gate Array).

In a case in which the processing sequence is executed by software, a program configuring the software is installed from a network or a storage medium into a computer or the like. The computer may be a computer embedded in dedicated hardware. Alternatively, the computer may be a computer capable of executing various functions by installing various programs, e.g., a general-purpose personal computer.

The storage medium containing such a program can not only be constituted by the removable medium 31 shown in FIG. 1B distributed separately from the device main body for supplying the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Blu-ray (Registered Trade Mark) or the like. The magnetic optical disk is composed of an MD (Mini-Disk) or the like. The storage medium supplied to the user in a state incorporated in the device main body in advance may include, for example, the ROM 16 shown in FIG. 1B or the like, in which the program is recorded.

It should be noted that, in the present specification, the steps describing the program recorded in the storage medium include not only the processing executed in a time series following this order, but also processing executed in parallel or individually, which is not necessarily executed in a time series.

Although some embodiments of the present invention have been described above, the embodiments are merely exemplification, and do not limit the technical scope of the present invention. Other various embodiments can be employed for the present invention, and various modifications such as omission and replacement are possible without departing from the spirits of the present invention. Such embodiments and modifications are included in the scope of the invention and the summary described in the present specification, and are included in the invention recited in the claims as well as the equivalent scope thereof.

EXPLANATION OF REFERENCE NUMERALS

1 . . . Wrist terminal, 11 . . . Control unit, 12 . . . Sensor unit, 13 . . . Input unit, 14 . . . LCD, 15 . . . Timepiece circuit, 16 . . . ROM, 17 . . . RAM, 18 . . . GPS antenna, 19 . . . GPS module, 20 . . . Wireless communication antenna, 21 . . . Wireless communication module, 22 . . . Drive, 31 . . . Removable medium, 51 . . . Measurement information acquiring unit, 52 . . . First timing detection unit, 53 . . . Second timing detection unit, 54 . . . Recording control unit, 55 . . . Display control unit, 71 . . . History data storage unit

What is claimed is:

1. A movement analyze device used for a sport, the movement analyze device comprising:
 a processor configured to execute:
   a first detection processing comprising detecting a standby state of a user engaged in the sport based on a positional relationship between the user and a shoreline;
   a second detection processing comprising detecting a predetermined start timing of the sport after detecting the standby state; and
   a control processing comprising:
     in response to the first detecting processing detecting the standby state, starting successive acquisition of position information of the user at predetermined intervals; and
     in response to the second detecting processing detecting the predetermined start timing of the sport, storing position information already acquired and corresponding to the predetermined start timing to a storage device.

2. The movement analyze device according to claim 1, wherein the control processing comprises generating a movement path based on the position information stored to the storage device.

3. The movement analyze device according to claim 2, wherein the control processing comprises controlling a display to display the movement path generated.

4. The movement analyze device according to claim 1, wherein the second detection processing comprises detecting the predetermined start timing of the sport and finish timing of the sport, and
wherein the control processing comprises storing a period of time from the start timing to the finish timing as a duration of one motion to the storage device.

5. The movement analyze device according to claim 4, wherein the control processing comprises storing position information corresponding to the duration of the one motion to the storage device.

6. The movement analyze device according to claim 1, wherein the second detection processing comprises detecting timing of increase of movement of the user to a predetermined speed per hour or more as the predetermined start timing.

7. The movement analyze device according to claim 1, wherein the second detection processing comprises detecting timing of reduction of movement of the user to a predetermined speed per hour or less as finish timing after the predetermined start timing is detected.

8. The movement analyze device according to claim 1, wherein the sport is at least one of surfing and bodyboarding, and
wherein the control processing comprises storing measurement data about one motion showing that a predetermined speed per hour or more has been measured.

9. The movement analyze device according to claim 8, wherein the control processing comprises storing measurement data about the one motion showing that the predetermined speed per hour or more has been measured several times.

10. The movement analyze device according to claim 8, wherein the first detection processing comprises identifying the sport in which the user is in the standby state as at least one of surfing and bodyboarding.

11. The movement analyze device according to claim 10, wherein the first detection processing comprises:
 determining whether a current position of the user is at sea based on the position relationship between the user and the shoreline; and
 in response to determining that the user is at sea, detecting that the user is in the standby state.

12. The movement analyze device according to claim 3, wherein the control processing comprises controlling the display to display a plurality of types of measurement information acquired about the sport engaged in by the user with a map showing a current position of the user as a background of the display.

13. The movement analyze device according to claim 3, wherein the control processing comprises controlling the display to display the movement path with a map showing a current position of the user as a background of the display.

14. The movement analyze device according to claim 3, wherein the control processing comprises controlling the display to display a path from a takeoff position to a wipeout position as the movement path and a change of a moving speed of the user on the movement path.

15. The movement analyze device according to claim 2, wherein the sport is to be performed in a sea adjacent to a coast, and
wherein the control processing comprises controlling a display to display the movement path in such a manner that a range including the sea is displayed on one side of the display and a range including the coast is displayed on an opposing side of the display.

16. A movement analyze method used for a sport, the movement analyze method comprising:
- a first detection processing comprising detecting a standby state of a user engaged in the sport based on a positional relationship between the user and a shoreline;
- a second detection processing comprising detecting a predetermined start timing of the sport after detecting the standby state;
- in response to the first detecting processing detecting the standby state, starting successive acquisition of position information of the user at predetermined intervals; and
- in response to the second detecting processing detecting the predetermined start timing of the sport, storing position information already acquired and corresponding to the predetermined start timing to a storage device.

17. A non-transitory storage medium storing a program that controls a processor of a movement analyze device used for a sport to execute:
- a first detection processing of detecting a standby state of a user engaged in the sport based on a positional relationship between the user and a shoreline;
- a second detection processing of detecting a predetermined start timing of the sport after detecting the standby state; and
- a control processing comprising:
    - in response to the first detecting processing detecting the standby state, starting successive acquisition of position information of the user at predetermined intervals; and
    - in response to the second detecting processing detecting the predetermined start timing of the sport, storing position information already acquired and corresponding to the predetermined start timing to a storage device.

* * * * *